June 8, 1954  A. A. RAPPUHN, SR  2,680,773
BATTERY CELL AUTOMATIC RESERVOIR AND INDICATOR
Filed Sept. 21, 1950
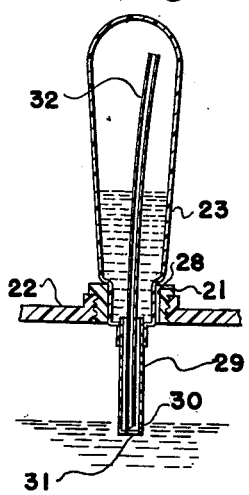
FIG·3·
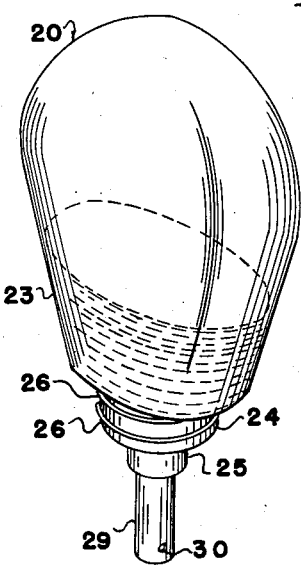
FIG·1·
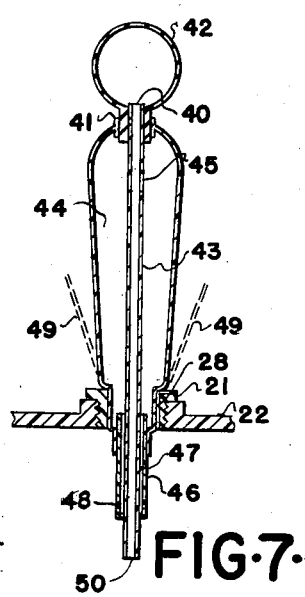
FIG·7·
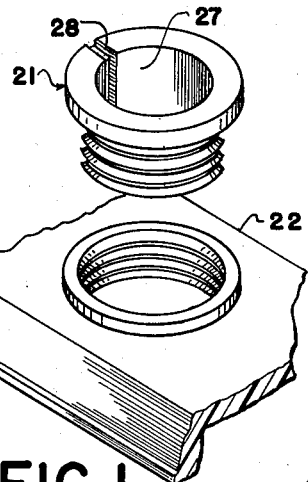
FIG·4·
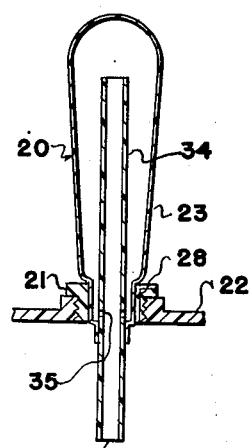
FIG·5·
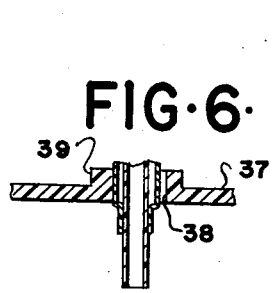
FIG·6·
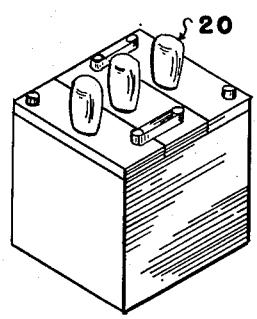
FIG·2·
INVENTOR
ALFRED A. RAPPUHN SR
BY
ATTORNEY Patented June 8, 1954

2,680,773

UNITED STATES PATENT OFFICE 2,680,773

BATTERY CELL AUTOMATIC RESERVOIR AND INDICATOR

Alfred A. Rappuhn, Sr., Bayside, N. Y.

Application September 21, 1950, Serial No. 185,942

9 Claims. (Cl. 136—162)

This invention pertains to a battery cell filler and indicator and, more particularly, to a device of the class set forth wherein novel features are presented which restrict or eliminate many of the undesirable features heretofore present in devices in this general category.

One of the advantages of the present invention is that the battery cell filler may be filled without inverting it, which was customarily the practice for the purpose of exhausting the air from within the device.

A further advantage is that an elongated tube is employed which extends substantially from the liquid level of the battery, when said device is in operative position, to an area in the upper portion of the filler thus permitting the air to be exhausted from the cell filler while restricting the expulsion of liquid due, among other things, to the flexibility of the side wall construction of the invention.

A further advantage of the invention is that tapered or inclined sides of the battery cell liquid container permits the liquid to expand vertically into an enlarged area when the liquid therein approaches the freezing point, depending on the specific gravity of said liquid, or electrolyte.

Another advantage is that an adaptor may be employed which when used with features of the invention provides means for facilitating removal and insertion of the battery cell filler in a novel manner.

Another advantage of the invention is to provide a liquid container for the battery cell filler, which may have tapered sides, and is preferably made of a substantially rigid material, and has a resilient or flexible compartment connected to a portion thereof and having an elongated tube extending therefrom substantially to the surface of the electrolyte within the battery and wherein communicating means are provided to permit the battery cell to be filled and tested by operation of said resilient compartment.

A further advantage of the invention is the provision of a novel adaptor which may be removably connected to the cell cover which will receive the battery cell filler of the invention to provide a series of coupling means between battery cell fillers and batteries of differing characteristics.

Other advantages of the invention may be and may become apparent from a perusal of the preferred illustrations shown herein. It is to be understood that variations, changes, and modifications may be made herein without departing from the spirit of the subjoined claims.

In the drawings:

Fig. 1 is an exploded perspective view of the battery cell filler and indicator in alignment for connection with an adaptor and a battery cell cover.

Fig. 2 is a perspective view of the invention in conjunction with a battery.

Fig. 3 is a vertical sectional view of one form of the invention.

Fig. 4 is a modification of Fig. 3 showing two separate tubes at the lower portion thereof.

Fig. 5 is a modification of the invention showing a single unitary tube connected with the battery cell liquid container.

Fig. 6 is a modification of the means for connecting the battery cell filler with a cell cover.

Fig. 7 is a modification of the invention showing a substantially rigid liquid container connected to a resilient bulb and interconnecting fluid communicating means.

Referring to the drawings there is shown a cell filler 20 disposed above an adaptor 21 in position for connection to the cell cover 22. The cell filler in Figs. 1, 3, 4 and 5 has a liquid container or reservoir 23 preferably made of flexible or resilient material with inclined or tapered sides having the side portions wider at the top, in normal position, than at the bottom. The reservoir at the lower portion thereof merges into a neck 24 which is adapted to engage either an adaptor or a cell cover. In the present views the neck is shown in conjunction with an adaptor so that the neck of the reservoir may frictionally engage the adaptor to hold the cell filler in its normally upright position. The neck then merges into a mouth 25 which is of smaller dimension than said neck. The reservoir, neck and mouth are presented herein as a unitary structure. The flexible or resilient material may be any material which is substantially resistant to electrolyte, for example, the material may be polyethylene or transparent gum rubber when used for a storage battery.

Referring more particularly to Fig. 1, the neck 24 of the cell filler 20 has an annular ring 26 which is in fact a friction seal for binding the neck of the filler when it is in position on the battery engaging the inner surface 27 of the adaptor 21. A vertical slot 28 extends the full length of the adaptor and communicates between the interior of the cell to the exterior of the adaptor to permit ventilation between the inside and the outside of the battery for normal circulation of fluids such as gas from the battery. A sleeve 29 is shown in Figs. 1, 3 and 7 which frictionally engages the mouth of the cell filler and extends to the liquid or electrolyte within the cell.

Referring more particularly to Figs. 1 and 3, the sleeve 29 has ports 30 to permit liquid and air to flow therethrough depending on the particular operation desired and the characteristics of the selected device.

The upper portion of the sleeve 29 is open to communicate with the interior of the reservoir 23, while the lower portion has a closure 31 in the bottom thereof. The filler tube 32 is elongated so that the upper portion extends adjacent the top of the reservoir while the lower portion thereof rests on the closure 31. A diameter of the filler tube 32 is smaller than the inside diameter of the sleeve 29 so that there is a permissive area for air and liquid to flow therebetween to permit passage of air and liquid between the reservoir and the ports 30 in the sleeve 29. The sleeve 29 as shown in Figs. 1 and 3 may be moved in and out of the reservoir so that the varying extent of the sleeve emergence from the reservoir may be moved to determine the height of the liquid in the cell as supplied by the reservoir through the ports 30.

In Fig. 4 the filler tube, in lieu of using a sleeve, has a short tube 33 adjacent the lower portion thereof and extending substantially to the same lower level position. Both of these tubes are secured to the mouth 25 in any convenient manner to hold them in position in relation to the reservoir. In Fig. 4 there is a vent space 28 shown in the adaptor 21 for its normal function to permit escape of gas from the cell as previously explained.

The modification shown in Fig. 5 shows a filler tube 34 having ports 35 in the neck area of the cell filler with these ports having a basic function of permitting the liquid in the reservoir to flow therethrough into the hollow of the filler tube 34 so that the liquid may emerge through the opening 36 in the lower end of said filler tube 34. The adaptor 21 is also shown connecting the cell filler 20 to the cell cover 22.

The modification shown in Fig. 6 shows a cell cover 37 which has substantially smooth sides, or an unthreaded portion to permit the neck of the cell filler to be inserted directly into the cell cover without the use of an adaptor. A vent 38 is formed in the hub 39 which is shown as an integral part of the cell cover and functions in the same manner as the slot 26 shown in the adaptor of Fig. 1. In the presentation shown in Fig. 6, the cell filler may be directly applied to the cell cover without the use of an adaptor and may or may not have the friction seal 26, or its equivalent, employed therewith.

The cell fillers 20 are shown in several of the views as having inclined sides, with a horizontal cross section thereof being paraboliform in contour with the side portions thereof preferably flat. The side walls and the end walls of the reservoir are preferably both inclined so that any expansion of the fluid therein upon approaching the freezing point would have a tendency to expand upward and relieve the pressure on the side and end walls of the reservoir.

In Figs. 1, 3, 4 and 5, the reservoir 23 has only one opening therein, and that is in the mouth at the lower portion thereof. Another modification of the invention is shown in Fig. 7 wherein the reservoir, neck and mouth of the cell filler may be substantially the same as that shown in Fig. 1 of the drawing but would preferably be made of a rigid material which has an opening 40 in the upper portion thereof to permit the neck 41 of the soft or resilient bulb 42 to be connected therewith.

The filler tube 43 is a hollow tube which communicates with the interior of the soft bulb 42. The connections between the bulb 42, the filler tube 43, the neck 41 and the opening 40 of the reservoir 44 are such that there is an air tight seal and water tight seal therebetween. Vents such as 45 are provided in the filler tube 43 at the upper portion thereof within the confines of the reservoir 44. The lower portion of the filler tube 43 extends into a sleeve 46 and has an air space 47 between said filler tube and the inner surface of said sleeve 46. The lower portion of the filler tube 43 extends through a lower opening in the sleeve 46 but is engaged by said lower edges of the sleeve opening to provide a tight seal between the lower edges of said sleeve and the filler tube.

Ports 48 are provided in the lower portion of the sleeve communicating between the exterior of the sleeve and the space 47 about the lower portion of the filler tube 43. The lower end of the filler tube extends beyond the sleeve. In this latter instance, the fluid of the reservoir 44 may flow through the space 47 and out of the ports 48 to fill the battery to its proper level depending on the characteristics of the particular device of the invention employed.

The dotted portions 49 shown in Fig. 7 indicate the side walls of the invention showing that the inclination of said side walls of the dotted portions 49 is greater than that of the side portion shown in solid lines. This is merely to indicate that the inclination of the side wall and end wall portions is not particularly critical for normal operation of the invention. In Fig. 7 the modification employs a reservoir of substantially rigid material since the soft bulb connected to the upper portion of said reservoir is sufficiently resilient to be pressed downwardly or squeezed in any desirable manner so that the air therein may be expelled to permit fluid to be drawn through the opening 50 upon release of the bulb 42 which restores to its normal shape thereby causing the fluid to be drawn upwardly through the filler tube 43 and emerge through the vents 45 due to gravity.

The distention of the bulb and the resilient fluid container or reservoir is caused by the inherent resilience of the particular materials which restore to their normal shapes after compression thereof, such as by a squeezing action which creates a partial vacuum in the reservoir to suck the liquid into said reservoir.

From the foregoing it will be seen that by employing a battery cell filler and indicator having inclined or tapered sides the filler permits more water to be carried in the reservoir than would be the case with cylindrical fillers. This is so because due to the connectors and cable terminals there is frequently limited space in the area of the battery caps where the filler would normally be utilized.

It should now be obvious that in order to test the battery so that the invention may be used as an indicator, it is merely necessary to squeeze the reservoir or soft bulb several times to see if the reservoir will fill with electrolyte from the battery. If, however, this is done and the indicator shows that the battery requires water, it is merely necessary to remove the battery cell filler, and without inverting same, fill the reservoir with liquid by several squeezes of the reservoir after inserting same in the water to be used for filling the battery. Thereafter, merely replace the battery cell filler and it will automatically permit the water to flow into the cell as is required. With the present invention the possibility of getting electrolyte on the clothing or other objects is greatly reduced, because the process of inverting the reservoir for filling same is no longer necessary.

Normally, due to vibration, and changes in temperature or atmospheric pressure, the battery cell filler when in position on the battery may indicate that the battery requires water. However, with the present invention, without removing same from the battery, the reservoir may be compressed a few times to see if the excess electrolyte in the battery, if any, will be drawn into the reservoir. If excessive fluid from the reservoir has been deposited into the cell, the squeezing operation will withdraw the excess fluid into the reservoir and it will again flow normally into the battery. In cold weather, with the present invention, a precaution against freezing of the fluid in the reservoir will be eliminated by simply squeezing the reservoir a few times to permit the water in the reservoir to mix with the electrolyte. With this operation the fluid in the reservoir will then have a greater specific gravity to reduce its potential of freezing.

From the foregoing it will be seen that the various advantages set forth hereinabove will be accomplished by the function of the present invention.

With the modification shown in Fig. 7, the battery cell filler may be left secured to the cell, and the soft bulb only may be removed to be used as a filler for the reservoir, thereby further decreasing the possibility of dropping acid on the clothing or other articles.

The reservoir is preferably made of a transparent material, but said material may also be translucent provided it is possible to see the fluid content therewithin.

What is claimed as new and desired to be secured by Letters Patent of the United States is:

1. A battery cell filler and indicator comprising a transparent resilient reservoir having inclined sides and being paraboliform in a horizontal cross section thereof, a stem fixedly connected adjacent the bottom of said reservoir and having communicating ports to permit a fluid within the reservoir to flow therefrom, a filler tube extending below the bottom of the reservoir and terminating within the upper portion of the reservoir, a communicating port in said filler tube to permit fluid to be drawn into said reservoir through said filler tube upon compressing and releasing the reservoir, means for securing the battery cell filler to the cell cover of a battery, and means to permit ventilation between the interior of the cell and the exterior thereof.

2. A battery cell filler and indicator comprising a transparent resilient reservoir having inclined sides continuously converging toward the bottom of the reservoir when disposed in an operative position and being paraboliform in a horizontal cross section thereof, a stem fixedly connected adjacent the bottom of said reservoir and having communicating ports to permit the fluid of the reservoir to flow therefrom, a filler tube extending below the bottom of the reservoir and terminating in the upper portion of the reservoir, a communicating port in said filler tube to permit fluid to be drawn into said reservoir through said filler tube upon distention of the reservoir, and means for securing the battery cell filler to the cell cover of a battery.

3. A battery cell filler and indicator comprising a transparent resilient reservoir having inclined sides substantially from the top thereof and converging toward the bottom thereof when in an operative position, a stem fixedly connected adjacent the bottom of said reservoir and having communicating ports to permit the fluid of the reservoir to flow therefrom, a filler tube extending below the bottom of the reservoir and terminating in the upper portion of the reservoir, and a communicating port in said filler tube, whereby fluid may be drawn into said reservoir through said filler tube upon compressing and releasing the reservoir and means for securing the battery cell filler to the cell cover of a battery.

4. A device which may be used for filling a storage battery including a reservoir of transparent flexible material having an opening therein and having inclined sides and being paraboliform in a horizontal cross sectional contour, a filler tube extending from adjacent the upper end of said reservoir through said opening and terminating therebelow, and hollow means connected to said reservoir adjacent said reservoir opening, said hollow means having communicating ports adjacent said connection to permit gravity flow of liquid from said reservoir to the exterior thereof.

5. A device applicable for dispensing liquid, including a reservoir with inclined sides of transparent flexible material having an opening therein and being paraboliform in a horizontal cross section contour, a filler tube extending interiorly from the upper end of said reservoir through said opening and terminating therebelow, hollow means having communicating ports connected to said reservoir adjacent said reservoir opening to permit gravity flow of liquid from said reservoir to the exterior thereof, and means connected adjacent the lower portion of said reservoir for positioning same in relation to a supporting structure for said device.

6. A device which may be used for emitting fluid into a receptacle having a resilient reservoir with an opening therein, a sleeve connected to said reservoir opening having communicating ports from the interior to the exterior of said reservoir, a filler tube having one end thereof adjacent the upper portion of said reservoir and terminating in the area of the lower portion of said sleeve, and means for securing said device to a supporting structure.

7. A device of the class described having a reservoir of flexible material, a neck portion formed adjacent one end of said reservoir, a mouth portion connected to said neck portion, a sleeve having communicating ports therein connected to said mouth portion, and a filler tube disposed within said reservoir and having one end terminating adjacent the upper portion thereof with the opposite end thereof terminating substantially beyond the confines of said reservoir.

8. A gravity fed fluid filling device having a flexible reservoir, a filler tube within said reservoir and terminating at one end thereof adjacent the upper portion of said reservoir with the other end of said filler tube terminating substantially beyond the confines of said reservoir, means connected adjacent the lower portion of said reservoir having communicating ports therein to permit gravity flow of fluid from said reservoir to the exterior thereof, last said means and the filler tube each having their lower ends terminating at substantially the same level, and means for securing said device to a supporting structure.

9. A device which may be used for filling a storage battery having a transparent flexible reservoir, an interconnected communicating means having at least one communicating port adjacent the interior upper portion of said flexible reservoir and at least a second communicating port adjacent the exterior lower portion of said flexible reservoir, and a second communicating means as a part of said device formed adjacent the interior lower portion of said flexible reservoir and communicating with the exterior lower portion of said device, first said communicating means and said second communicating means being stationary in relation to said reservoir.

References Cited in the file of this patent

UNITED STATES PATENTS

| Number | Name | Date |
|---|---|---|
| D. 168,110 | Montenier | Nov. 4, 1952 |
| 1,745,011 | Frejacques | Jan. 28, 1930 |
| 1,762,430 | Tokita | June 10, 1930 |
| 1,781,597 | Pearson | Nov. 11, 1930 |
| 1,815,348 | Cox | July 21, 1931 |
| 1,909,836 | Kline | May 16, 1933 |
| 1,984,803 | Marlowe | Dec. 18, 1934 |
| 2,135,158 | Wolfred | Nov. 1, 1938 |
| 2,339,642 | Le Gro et al. | Jan. 18, 1944 |
| 2,500,639 | Lermer | Mar. 14, 1950 |

FOREIGN PATENTS

| Number | Country | Date |
|---|---|---|
| 659,787 | France | Feb. 11, 1929 |
| 320,026 | Great Britain | Sept. 30, 1929 |
| 789,959 | France | Dec. 9, 1935 |
| 551,867 | Great Britain | Mar. 12, 1943 |

OTHER REFERENCES

Modern Plastics, Nov. 1947, page 158.